United States Patent [19]
Yanagisawa

[11] Patent Number: 5,593,361
[45] Date of Patent: Jan. 14, 1997

[54] SPEED CHANGER

[75] Inventor: Ken Yanagisawa, Matsumoto, Japan

[73] Assignee: Yugen Kaisha Sozoan, Nagano-ken, Japan

[21] Appl. No.: 363,817

[22] Filed: Dec. 27, 1994

[30] Foreign Application Priority Data

Dec. 27, 1993 [JP] Japan .................................. 5-330493

[51] Int. Cl.$^6$ ................................................. B23Q 1/18
[52] U.S. Cl. ............................................ 475/342; 74/409
[58] Field of Search ............................ 475/341, 342; 74/409

[56] References Cited

U.S. PATENT DOCUMENTS

| | | | |
|---|---|---|---|
| 2,033,749 | 3/1936 | Walter | 475/342 |
| 2,189,776 | 2/1940 | Bowen | 475/342 |
| 2,802,377 | 8/1957 | Berthiez | 475/342 |
| 4,366,727 | 1/1983 | Jonsson | 475/342 |
| 4,850,247 | 7/1989 | Yu | 475/342 |
| 4,882,943 | 11/1989 | Pipon et al. | 475/342 |
| 4,942,781 | 7/1990 | Hori | 475/342 |
| 5,171,195 | 12/1992 | Funamoto | 475/342 |
| 5,240,462 | 8/1993 | Mochizuki et al. | 475/341 |
| 5,409,430 | 4/1995 | Hashimoto et al. | 475/409 |

*Primary Examiner*—Dirk Wright
*Attorney, Agent, or Firm*—Birch, Stewart, Kolasch & Birch, LLP

[57] ABSTRACT

The object of the present invention is to provide a speed changer having a simple structure and great speed changing ratio. In the speed changer of the present invention, a movable gear section has a first pinion gear and a second pinion gear, which are coaxially integrated and which are capable of spinning about their common axis. A motor moves the movable gear section on a circular orbit. A fixed ring gear fixedly encompasses the circular orbit, the fixed ring gear has a first inner gear section, which is formed on an inner circumferential face, wherein the first pinion gear is capable of engaging with the first inner gear section and rolling thereon. An output ring gear rotatably encompasses the circular orbit, the output ring gear is coaxial to the fixed ring gear, the output ring gear has a second inner gear section, which is formed on an inner circumferential face, wherein the second pinion gear is capable of engaging with the second inner gear section and rolling thereon.

12 Claims, 11 Drawing Sheets

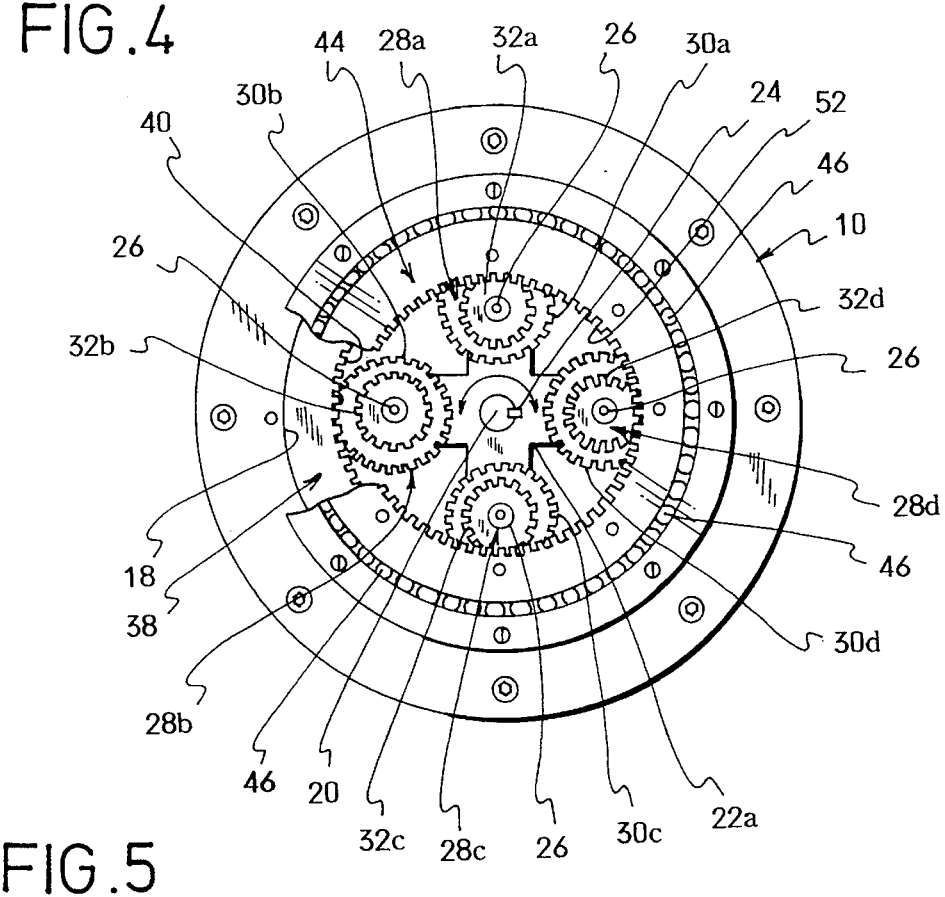

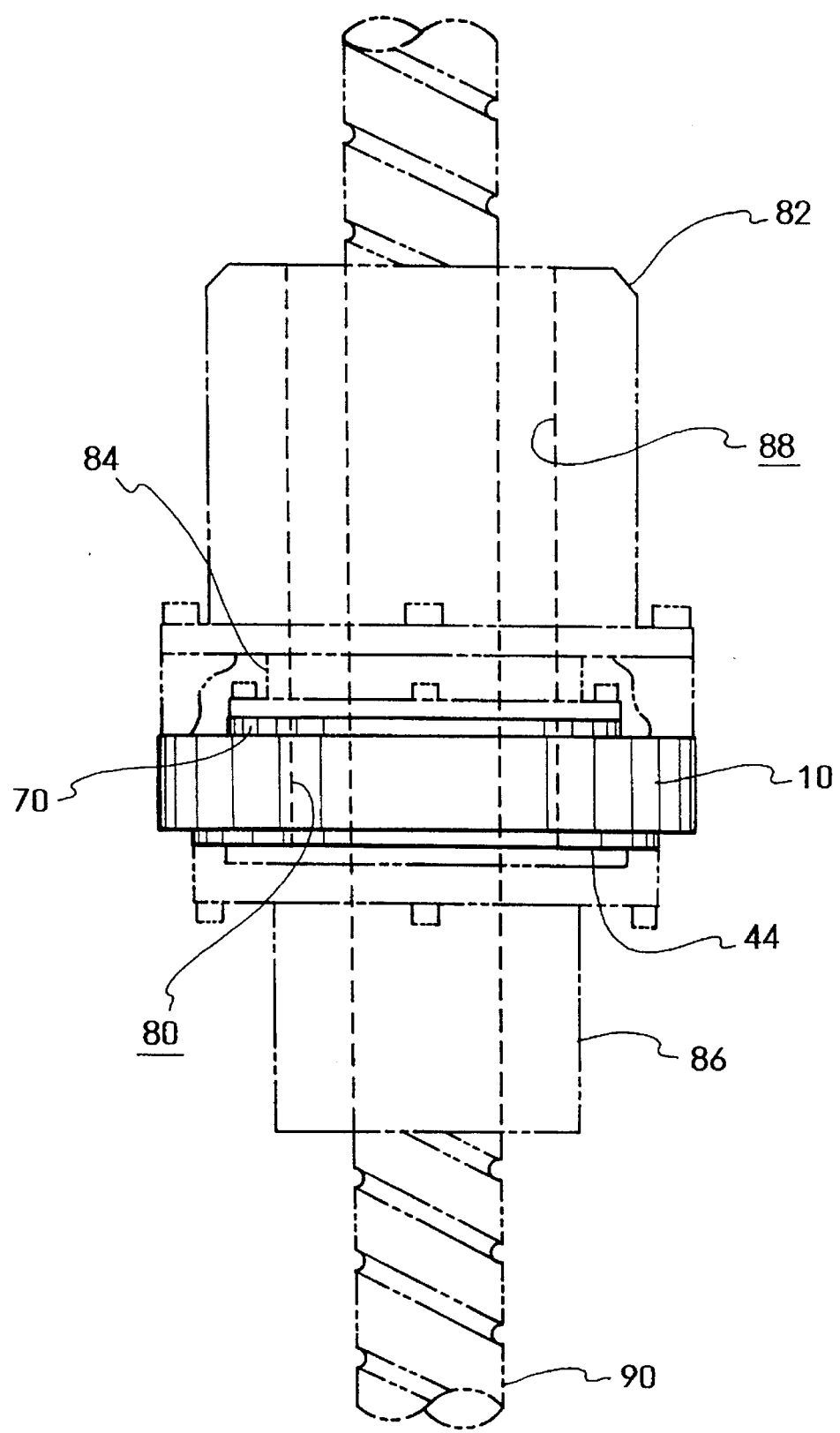

5,593,361

SPEED CHANGER

BACKGROUND OF THE INVENTION

1. Field of the Invention

The present invention relates to a speed changer.

2. Description of Background Art

Conventionally, speed changers for accelerating or decelerating speed of an output section have been known. They have a gear system for reducing or increasing speed thereof.

However, the conventional speed changers having a gear system have a disadvantage. Namely, multiple gears must be combined to reduce or increase the speed. By employing multiple gears, the speed changer must be complex in structure and large in size.

SUMMARY OF THE INVENTION

An object of the present invention is to provide a speed changer having a simple structure and a great speed changing ratio.

To achieve the object, the speed changer of the present invention comprises:

a movable gear section having a first pinion gear and a second pinion gear, which are coaxially integrated and which are capable of spinning about their common axis;

driving means for spinably moving the movable gear section on a circular orbit, the driving means includes a cylindrical member affixed to the movable gear section wherein the cylindrical member is provided on an inner side of the movable gear section and coaxial to the circular orbit and capable of spinning about its axis, a fixed ring gear fixedly encompassing the circular orbit, the fixed ring gear having a first inner gear section, which is formed on an inner circumferential face, wherein the first pinion gear is capable of engaging with the first inner gear section and rolling thereon; and an output ring gear rotatably encompassing the circular orbit, the output ring gear being coaxial to the fixed ring gear, the output ring gear having a second inner gear section, which is formed on an inner circumferential face, wherein the second pinion gear is capable of engaging with the second inner gear section and rolling thereon.

In the speed changer, a plurality of movable gear sections, which are capable of integrally moving on the circular orbit, may be employed.

Further, the driving means may have a driving gear engaging with the first pinion gear so as to make the movable gear section spin and move on the circular orbit.

In the present invention, the rotational speed of the movable gear section is changed on the basis of the gear ratio between the first pinion gear and the first inner gear section of the fixed ring gear. Further, the speed change is executed on the basis of the gear ratio between the second pinion gear and the second inner gear section of the output ring gear. Thus, the speed changing ratio for accelerating and/or decelerating can be greater. In addition the great speed changing can be executed by adjusting the gear ratio between the first pinion gear and the first inner gear section, and between the second pinion gear and the second inner gear section without using a multiple gear system, which is employed in the conventional ones. With this structure, the speed changer of the present invention can be formed smaller and thinner in size.

Especially, in case of employing a plurality of the movable gear sections, which are capable of integrally moving on the circular orbit, the output ring gear can be rotatably supported at a plurality of positions. Thus, eccentric rotation of the output ring gear can be prevented, so that stable rotation of the output ring gear without noise and vibration can be executed.

Furthermore, in case of employing the driving gear engaging with the first pinion gear, a driven member which is directly driven by the driving means is the driving gear only, so that required torque of the driving means can be small. In addition the driving gear acts as a sun gear with respect to the first pinion gear, so the speed is changed between both gears and the speed changing ratio can be further increased. With a greater speed changing ratio, the rotational speed of the movable gear section can be reduced, so that the noise can be reduced.

BRIEF DESCRIPTION OF THE DRAWINGS

Embodiments of the present invention will now be described by way of examples and with reference to the accompanying drawings, in which:

FIG. 4 is a plan view of a speed changer of a second embodiment wherein an output section has been disassembled;

FIG. 5 is a front sectional view of the speed changer of the second embodiment;

FIG. 10 is an explanation view showing a device employing the speed changer of the fourth embodiment;

DETAILED DESCRIPTION OF THE PREFERRED EMBODIMENTS

Preferred embodiments of the present invention will now be described in detail with reference to the accompanying drawings.

Figure 1:
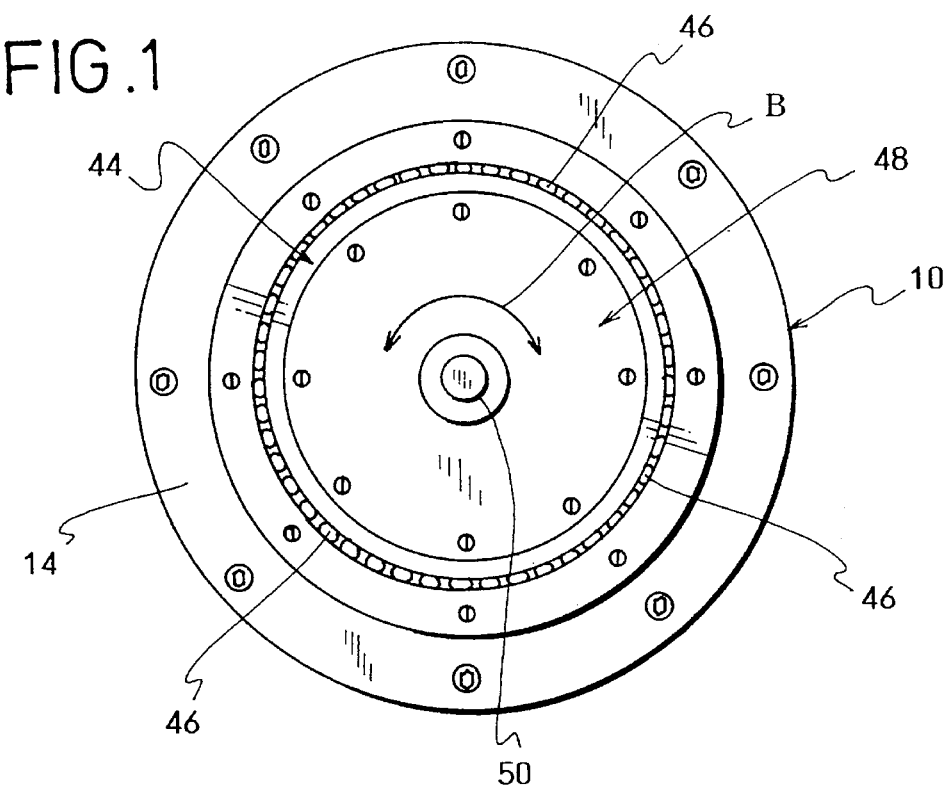
FIG. 1 is a plan view of a speed changer of a first embodiment of the present invention.
Figure 2:
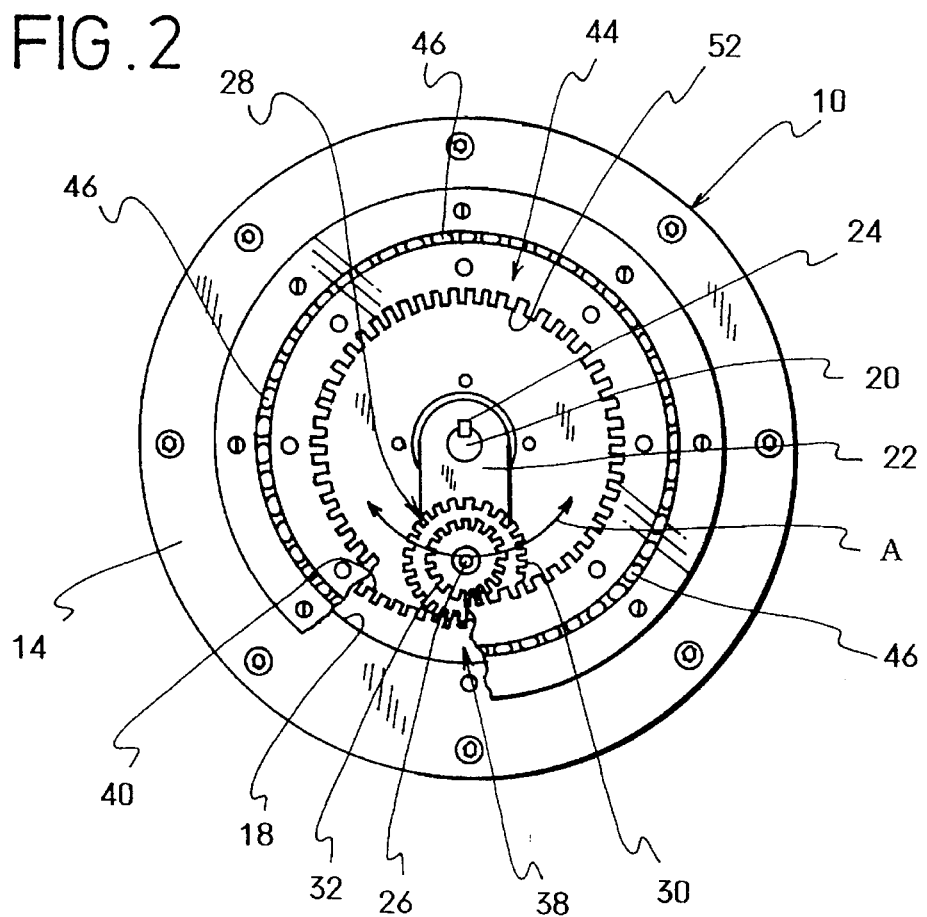
FIG. 2 is a plan view of the speed changer of the first embodiment wherein an output section has been disassembled.
Figure 3:
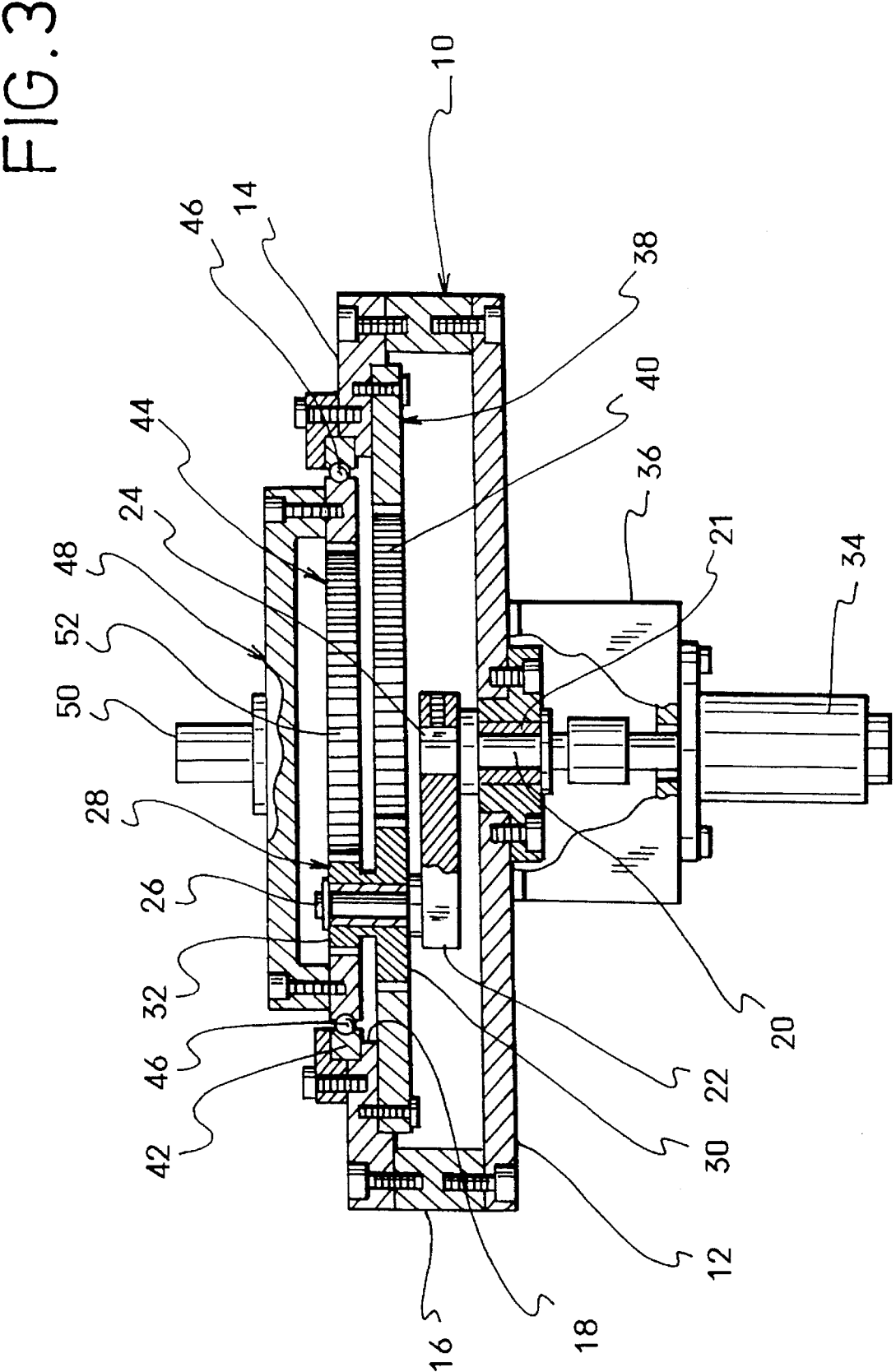
FIG. 3 is a front sectional view of the speed changer of the first embodiment.

A first embodiment will be explained with reference to FIGS. 1–3.

Firstly, a structure will be explained.

A casing 10 comprises a lower base 12, an upper cover 14 and a connecting section 16. The lower base 12 is supported by legs (not shown). There is bored a through hole 18 in a center of the upper cover 14.

An input shaft 20, which is an example of an input section, is vertically and rotatably provided in the center of the lower base 12 with a bearing 21.

One end of a lever 22 is horizontally fixed at an upper end of the input shaft 20 by a key 24. With this structure, the lever 22 is rotated in a horizontal plane when the input shaft 20 is spun about its axis. At the other end of the lever 22, a vertical shaft 26 extends upwardly.

A movable gear section 28 has a first pinion gear 30 and a second pinion gear 32, which are vertically arranged. The number of teeth of the first pinion gear 30 is different from that of the second pinion gear 32. The first pinion gear 30 and the second pinion gear 32 are coaxially integrated. The movable gear section 28 is rotatably attached to a vertical shaft 26. When the lever 22 is rotated, the movable gear section 28 is moved on a circular orbit (see an arrow A) whose diameter is defined by the length of the lever 22.

A servo motor 34, which is an example of driving means, is fixed under the lower base 12 by a fixing member 36. The motor 34 spins the input shaft 20 at an initial speed. As described above, the movable gear section 28 is moved on the circular orbit in the direction of the arrow A when the motor 34 spins the input shaft 20. Note that, the driving means is not limited to the servo motor, any means for moving the movable gear section 28 along the orbit, e.g., an engine and a crank, may be employed as the driving means.

A fixed ring gear 38 is formed into a ring shape. The fixed ring gear 38 is provided coaxial to the through hole 18 and fixed on a bottom face of the upper cover 14. The fixed ring gear 38 encompasses the circular orbit of the movable gear section 28. There is formed a first inner gear section 40 on an inner circumferential face of the fixed ring gear 38. The first pinion gear 30 engages with the first inner gear section 40 and rolls thereon.

An outer ring section 42 is fixed along an edge of the through hole 18 of the upper cover 14.

An output ring gear 44 is formed into a ring shape. The output ring gear 44 is provided inside of the outer ring section 42 coaxial to the through hole 18. Steel balls 46 are provided between the output ring gear 44 and the outer ring section 42, so that they form a ball bearing. The output ring gear 44 is capable of rotating in the circumferential direction. The output ring gear 44 also encompasses the circular orbit of the movable gear section 28. There is formed a second inner gear section 52 on an inner circumferential face of the output ring gear 44. The second pinion gear 32 engages with the second inner gear section 52 and rolls thereon.

An output section 48 is fixed on an upper face of the output ring gear 44. An output shaft 50 vertically extends upward at the center of an upper face of the output section 48. In the first embodiment, the output shaft 50 can spin in the direction of an arrow B together with the output ring gear 44, so shaft-rotary torque with changed rotational speed can be obtained through the output shaft 50.

Note that, output torque may be obtained through not only the output shaft 50 but also the output ring gear 44. Orbital movement-torque can be obtained through the output ring gear 44.

Successively, the action of the speed changer will be explained.

When the motor 34 is started, the input shaft 20 is spun at the initial rotational speed. Since the lever 22 is fixed to the input shaft 20, the lever 22 is rotated in the horizontal plane. Simultaneously, the movable gear section 28 is moved on the circular orbit whose diameter is defined by the length of the lever 22 in the direction of the arrow A.

While the orbital movement of the movable gear section 28, the first pinion gear 30, which engages with the inner gear section 40 of the fixed ring gear 38, spins and moves on the circular orbit. The second pinion gear 32, which is integrated with the first pinion gear 30, also spins and moves on the orbit together with the first pinion gear 30.

The spinning speed of the first pinion gear 30 and the second pinion gear 32 is defined on the basis of the gear ratio between the first pinion gear 30 and the first inner gear section 40 of the fixed ring gear 38.

With the spinning and the orbital movement of the second pinion gear 32, the output ring gear 44, which engages with the second pinion gear 32, is rotated at the rotational speed defined on the basis of the gear ratio between the second pinion gear 32 and the second inner gear section 52. Then the shaft-rotary torque in the direction of the arrow B with changed rotational speed can be obtained through the output shaft 50.

In the speed changer of the first embodiment, the rotational speed of the movable gear section 28 is changed on the basis of the gear ratio between the first pinion gear 30 and the first inner gear section 40 of the fixed ring gear 38. The changed speed is further changed on the basis of the gear ratio between the second pinion gear 32 and the second inner gear section 52 of the output ring gear 44. Thus, the speed changing ratio for accelerating and/or decelerating can be increased.

A second embodiment will be explained with reference to FIGS. 4 and 5. Note that, elements which have been explained in the first embodiment are assigned the same numeric symbols, and explanation will be omitted.

The lever 22a is formed in the shape of a cross. Movable gear sections 28a, 28b, 28c and 28d are provided at each end of the lever 22a. The movable gear sections 28a, 28b, 28c and 28d are capable of moving on the same circular orbit. The first pinion gears 30a, 30b, 30c and 30d have the same diameter and the same number of teeth, and engage with the first inner gear section 40 of the fixed ring gear 38; the second pinion gears 32a, 32b, 32c and 32d have the same diameter and the same number of teeth, and engage with the second inner gear section 52 of the output ring gear 44.

The action of the second embodiment for getting the shaft-rotary torque through the output shaft 50 is the same as that of the first embodiment. Especially, in the second embodiment, the output ring gear 44 can be always rotatably supported at a plurality of positions. Thus, eccentric rotation of the output ring gear 44 can be prevented, so that stable rotation of the output ring gear 44 without noise and vibration can be executed.

Figure 6:
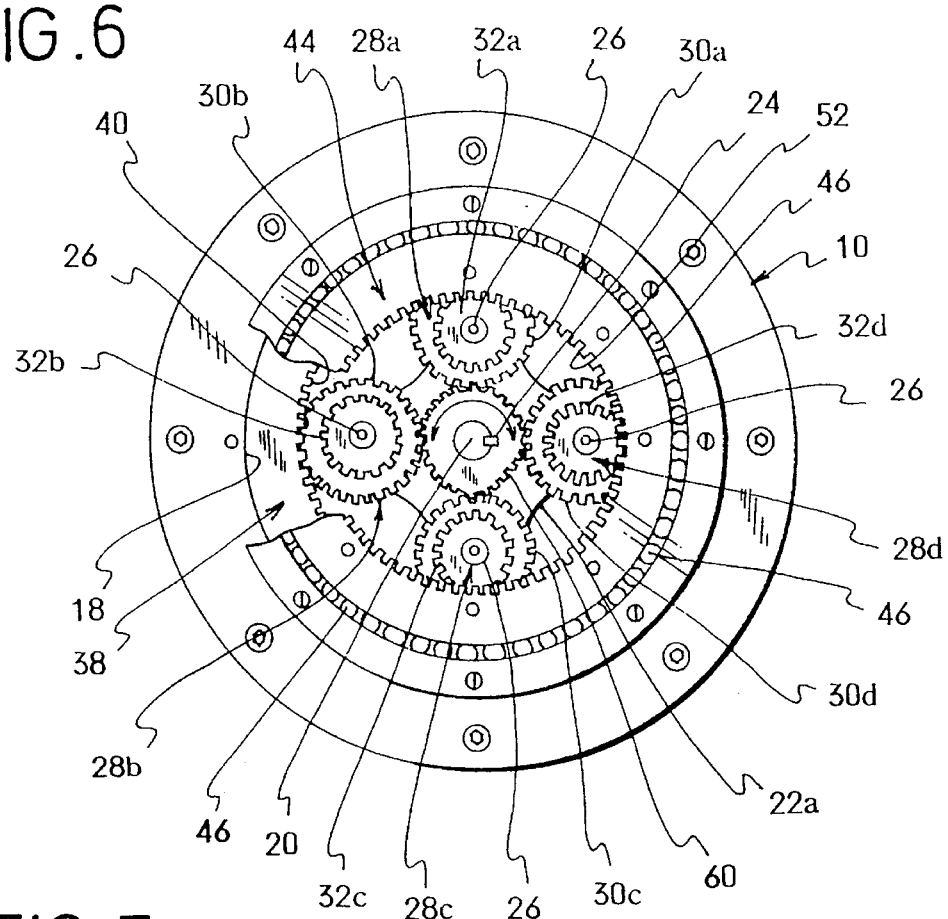
FIG. 6 is a plan view of a speed changer of a third embodiment wherein an output section has been disassembled.
Figure 7:
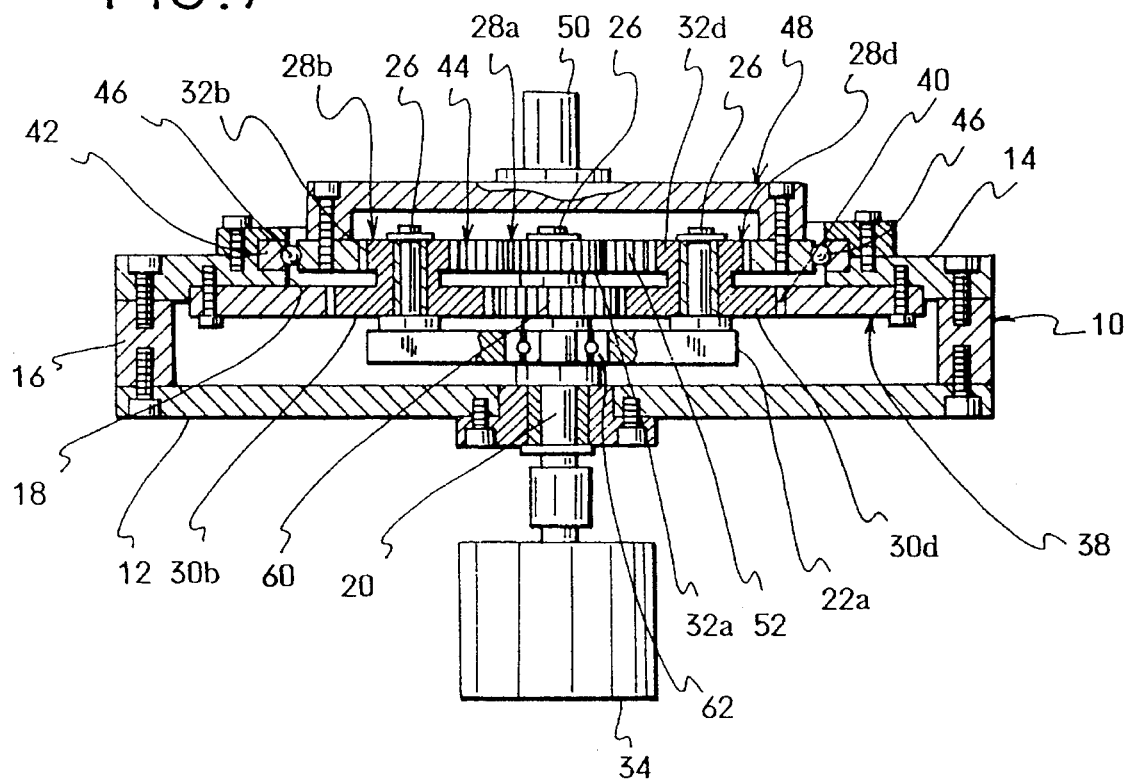
FIG. 7 is a front sectional view of the speed changer of the third embodiment.

A third embodiment will be explained with reference to FIGS. 6 and 7. Note that, elements which have been explained in the foregoing embodiment are assigned the same numeric symbols, and explanation will be omitted.

In the first and the second embodiments, the motor 34 moves with the lever 22 or 22*a*. With the lever 22 or 22*a*, the motor 34 is required to have a greater torque for moving the movable gear section 28 or the sections 28*a*, 28*b*, 28*c* and 28*d*. The third embodiment provides a speed changer which is not required to have a greater torque.

A driving gear 60 is fixed to the upper end of the input shaft 20, which is connected with the motor 34. The driving gear 60 is provided coaxial to the fixed ring gear 38 and the output ring gear 44, The driving gear 60 spins together with the input shaft 20, which is spun by the motor 34, The driving gear 60 engages with all of the first pinion gears 30*a*, 30*b*, 30*c* and 30*d*, so that the driving gear 60 acts as the sun gear with respect to the first pinion gears 30*a*, 30*b*, 30*c* and 30*d*.

Note that, the input shaft 20 is rotatably pierced through the lever 22*a* with a ball bearing 62.

In the third embodiment, the driving gear 60 spins the first pinion gears 30*a*, 30*b*, 30*c* and 30*d* when the motor 34 spins the input shaft 20 and the driving gear 60. With the spinning of the first pinion gears 30*a*, 30*b*, 30*c* and 30*d*, the movable gear sections 28*a*, 28*b*, 28*c* and 28*d* spin and are moved on the circular orbit. The action for speed changing with the movable gear sections 28*a*, 28*b*, 28*c* and 28*d*, the fixed ring gear 38 and the output ring gear 44 is the same as that of the second embodiment, so the explanation of the action will be omitted.

In the third embodiment, a driven member which is directly driven by the motor 34 is the driving gear 60 only, so that the required torque of the motor 34 can be small. In addition the driving gear 60 acts as a sun gear with respect to the first pinion gear 30*a*, 30*b*, 30*c* and 30*d*, so the rotational speed is changed between the driving gear 60 and the first pinion gears 30*a*, 30*b*, 30*c* and 30*d*, so the speed changing ratio can be further increased. Compared with the second embodiment, even if the changed rotational speed of the third embodiment is lower than that of the second embodiment, the output torque of the third embodiment can be the same as that of the second embodiment due to the great speed changing ratio. So the rotational speed of the movable gear section 28*a*, 28*b*, 28*c* and 28*d* can be reduced, and the noise can be reduced.

Note that, in the third embodiment, the driving gear 60 drives a plurality of movable gear sections 28*a*, 28*b*, 28*c* and 28*d* but it can be employed to the speed changer having one movable gear section as well as the first embodiment.

Figure 8:
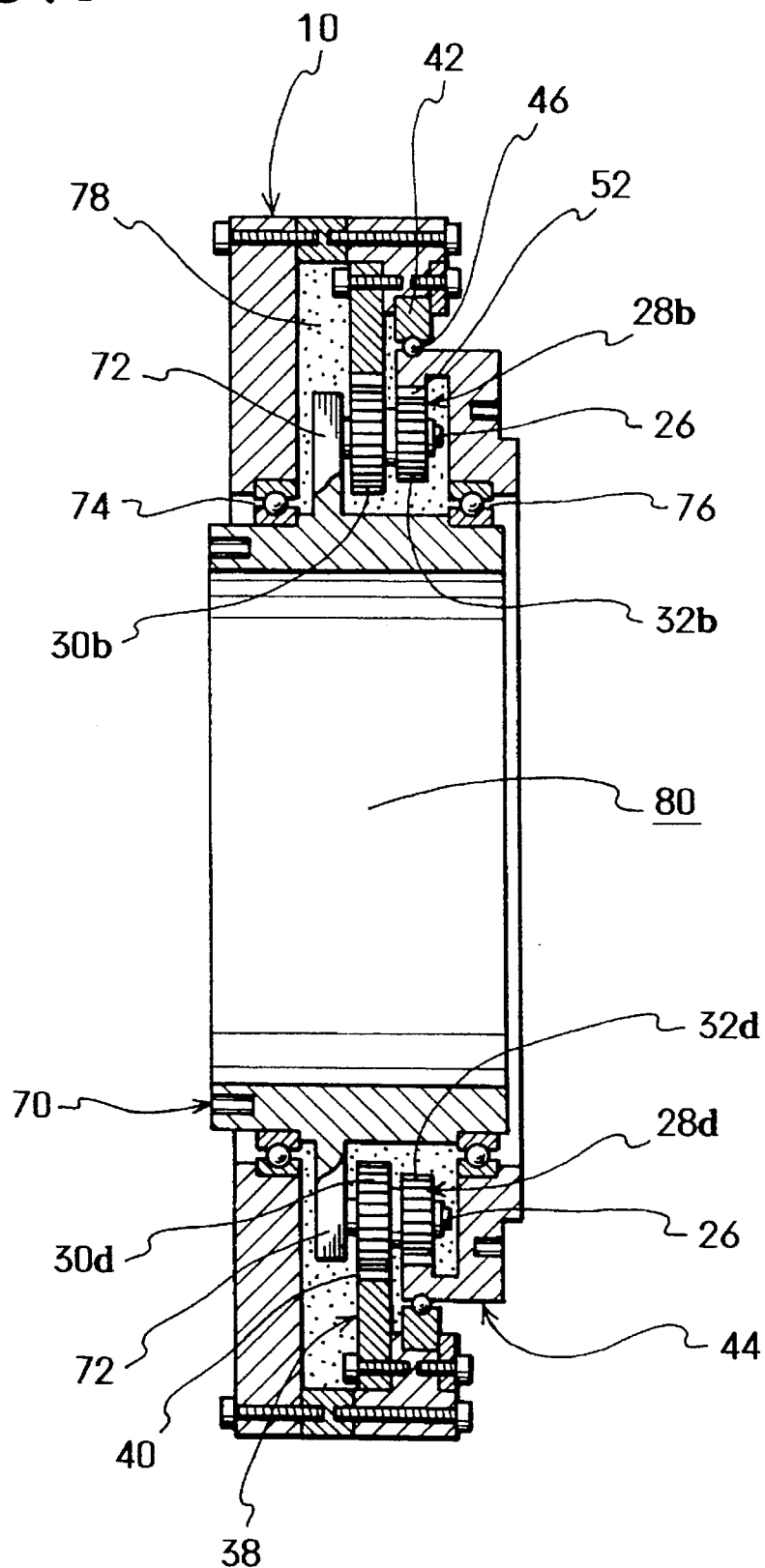
FIG. 8 is a front sectional view of a speed changer of a fourth embodiment.
Figure 9:
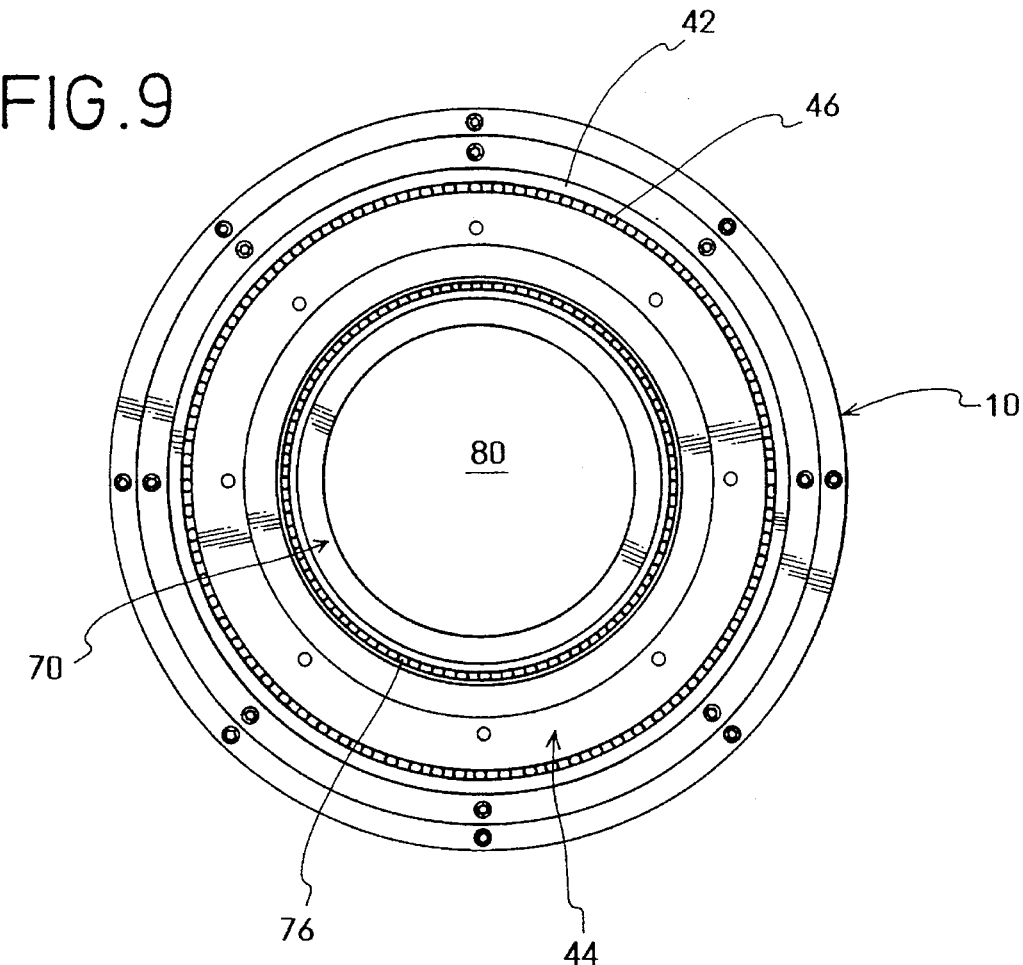
FIG. 9 is a side view of the speed changer of the fourth embodiment.

A fourth embodiment will be explained with reference to FIGS. 8–10. Note that, elements which have been explained in the foregoing embodiment are assigned the same numeric symbols, and explanation will be omitted.

In the first and the second embodiments, the movable gear section 28 or sections 28*a*, 28*b*, 28*c* and 28*d* are moved by the driving means including the lever 22 or 22*a*. In the fourth embodiment, a cylindrical member 70 is employed instead of the lever 22 or 22*a*.

Both ends of the cylindrical member 70 are opened. Four extended sections 72 (two of them are shown in FIG. 8) are provided in the radial directions from an outer circumferential face of the cylindrical member 70. The extended sections 72 are provided at regular angular intervals. The movable gear sections 28*a*, 28*b*, 28*c* and 28*d* (the sections 28*b* and 28*d* are shown in FIG. 8) are respectively provided to each extended section 72. The cylindrical member 70 is rotatably held in the casing 10 by ball bearings 74 and 76.

When the driving means rotates the cylindrical member 70 about its axis, the output ring gear 44 can be rotated at the changed rotational speed. The action of the fourth embodiment is the same as that of the first and the second embodiments. In the fourth embodiment, the output ring gear 44 can be rotatably supported at a plurality of positions. Thus, eccentric rotation of the output ring gear 44 can be prevented, so that stable rotation of the output ring gear 44 without noise and vibration can be executed.

Further, the casing 10 is filled with a lubricant 78, e.g., grease, so that abrasion and noise of the inner mechanism can be prevented.

The speed changer of the fourth embodiment has the hollow cylindrical member 70 and the hollow casing 10, so they form a large hollow space 80. An example of applied devices is shown in FIG. 10.

A hollow motor 82, which is an example of the driving means, has a through hole 88, which is coaxial to the hollow space 80 of the speed changer. A ring rotor 84 of the motor 82 is connected with the cylindrical member 70, so that the motor 82 rotates the cylindrical member 70.

A ball nut 86 is coaxially connected with the output ring gear 44. Thus, the ball nut 86 spins by the output ring gear 44.

A ball screw 90 is pierced through the hollow space 80 and through hole 88 and screwed with the ball nut 86.

In the device shown in FIG. 10, when the motor 82 is driven, the output ring gear 44 rotates at the changed rotational speed. The ball nut 86 spins together with the output ring gear 44 at the same rotational speed. With this structure, the ball screw 90 is linearly moved in the axial direction at the speed corresponding to the rotational speed of the ball nut 86. Note that, the linear moving direction of the ball screw 90 can be defined by the rotational direction of the ring rotor 84 of the motor 82.

In this example, the ball screw 90 is pierced through the hollow space 80 and through hole 88 but any members, e. cables, tubes, may be pierced therethrough.

A fifth embodiment will be explained with reference to FIG. 11. Note that, elements which have been explained in the foregoing embodiment are assigned the same numeric symbols, and explanation will be omitted.

The fifth embodiment is a modified embodiment of the third embodiment. The fifth embodiment has the cylindrical member 70 as well as the fourth embodiment. The driving gear 60 is formed on the outer circumferential face of the cylindrical member 70.

Figure 11:
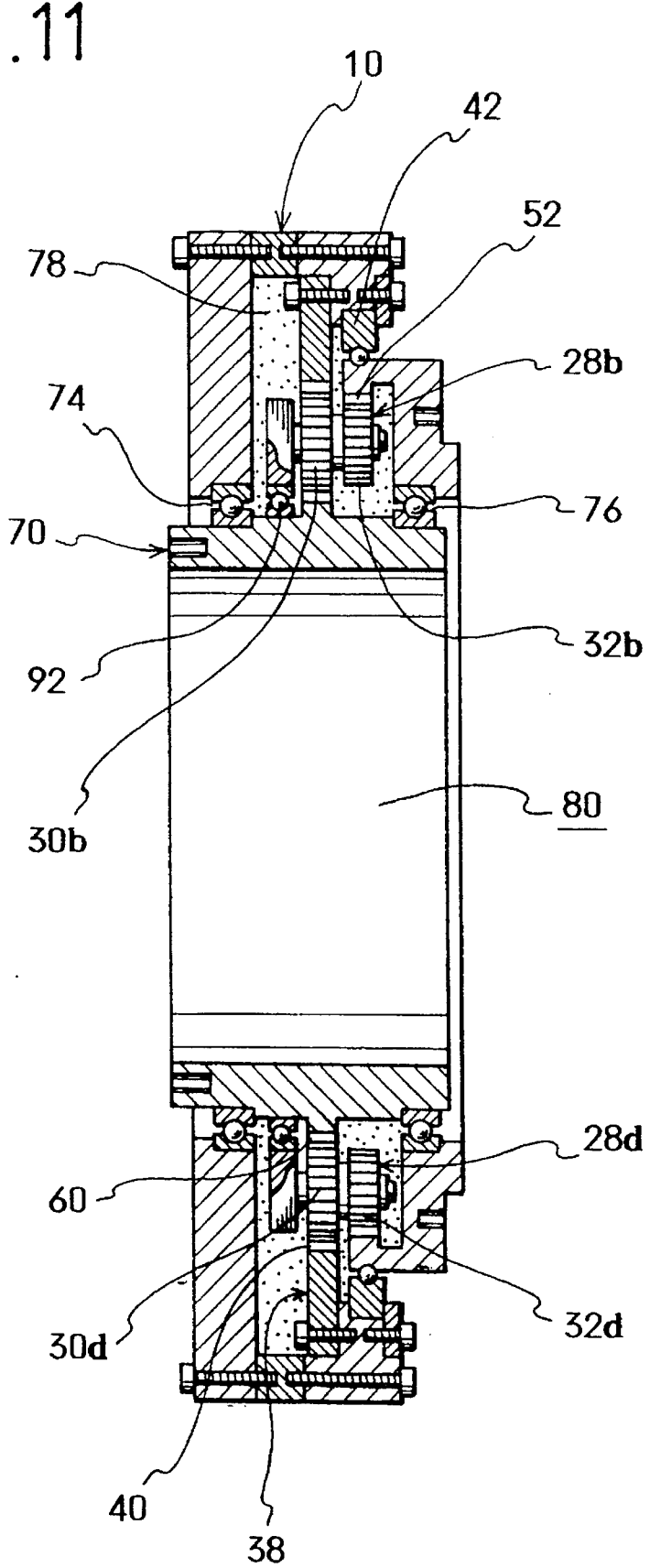
FIG. 11 is a front sectional view of a speed changer of a fifth embodiment.

By employing a ball bearing 92, the cylindrical member 70 is rotatable with respect to the movable gear sections 28*a*, 28*b*, 28*c* and 28*d* (the sections 28*b* and 28*d* are shown in FIG. 11).

When the driving means rotates the cylindrical member 70 about its axis, the output ring gear 44 can be rotated at the changed rotational speed. The action of the fifth embodiment is the same as that of the third embodiment. And effects are also the same as that of the third embodiment.

Further, the cylindrical member 70 has the hollow space 80 as well as the fourth embodiment, so the speed changer may be applied to devices such as the one shown in FIG. 10.

Successively, mechanisms for increasing the accuracy of the speed changer will be explained. The mechanisms are capable of removing backlash between the first pinion gears and the first inner gear section of the fixed ring gear, and between the second pinion gears and the second inner gear section of the output ring gear.

A first example will be explained with reference to FIGS. 12–14.

Figure 12:
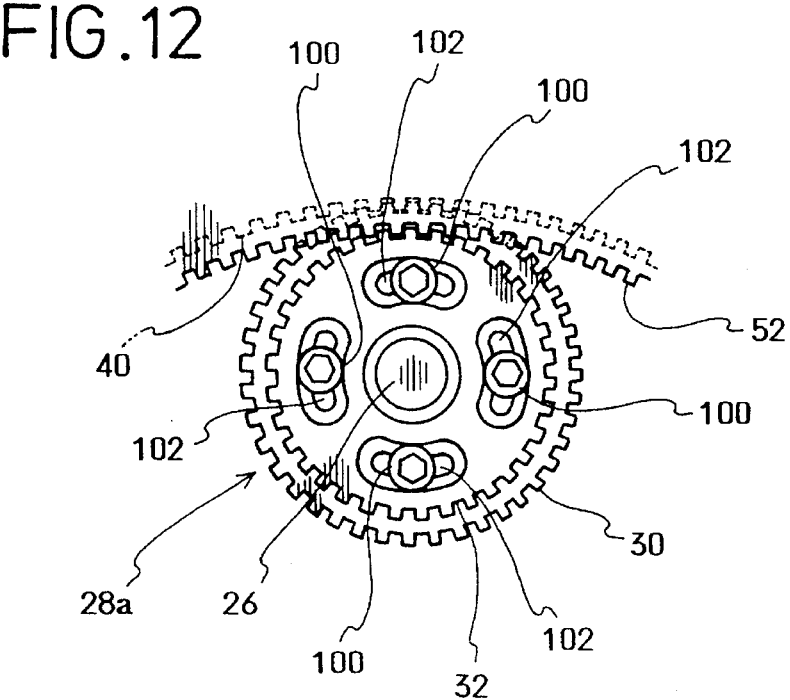
FIG. 12 is a partial plan view of a movable gear section having means for adjusting relative angular position between a first pinion gear and a second pinion gear.
Figure 13:
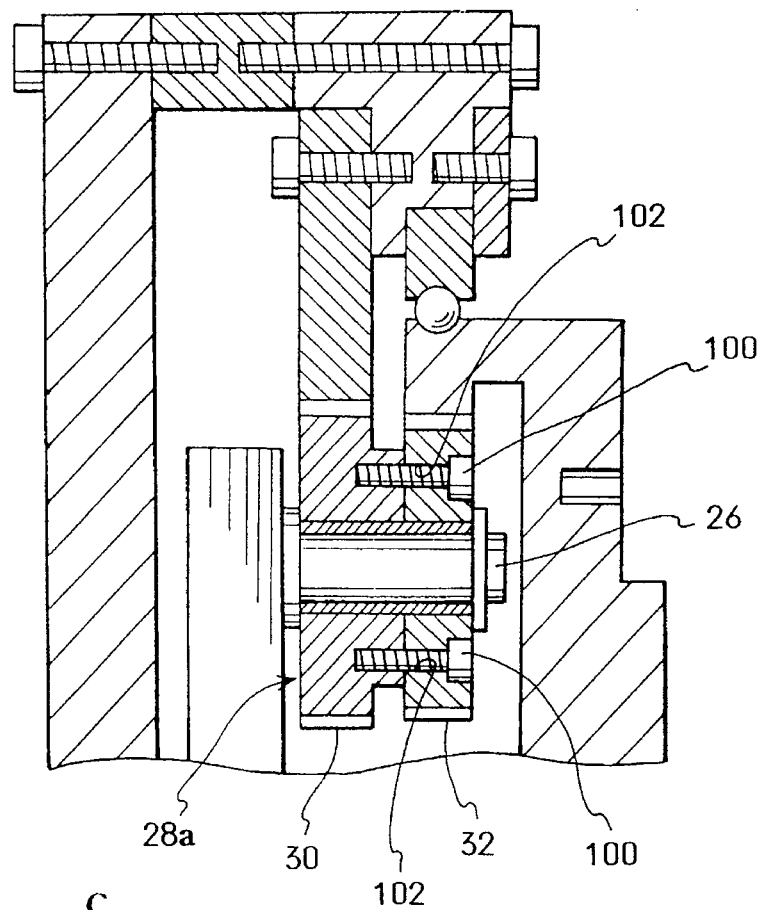
FIG. 13 is a partial sectional view showing the movable gear section shown in FIG. 12.

In FIGS. 12 and 13, there is provided means for adjusting the relative angular position between the first pinion gear 30 and the second pinion gear 32 in the movable gear section 28a. The first pinion gear 30 and the second pinion gear 32 are fixedly connected by a bolt 100. The bolt 100 is pierced through an arched through hole 102, which is formed in the second pinion gear 32, and screwed with the first pinion gear 30. With this structure, the second pinion gear 32 can be moved in the circumferential direction with respect to the first pinion gear 30 in a range defined by the length of the arched through hole 102 when the bolt 100 is loosened.

By moving the second pinion gear 32, the relative angular position between the first pinion gear 30 and the second pinion gear 32 can be adjusted. The backlash between the first pinion gears 30 and the first inner gear section 40, and between the second pinion gear 32 and the second inner gear section 52 the output ring gear is removed by adjusting the relative angular position between the first pinion gear 30 and the second pinion gear 32. Upon completing the adjustment, the bolt 100 is tightened.

Figure 14:
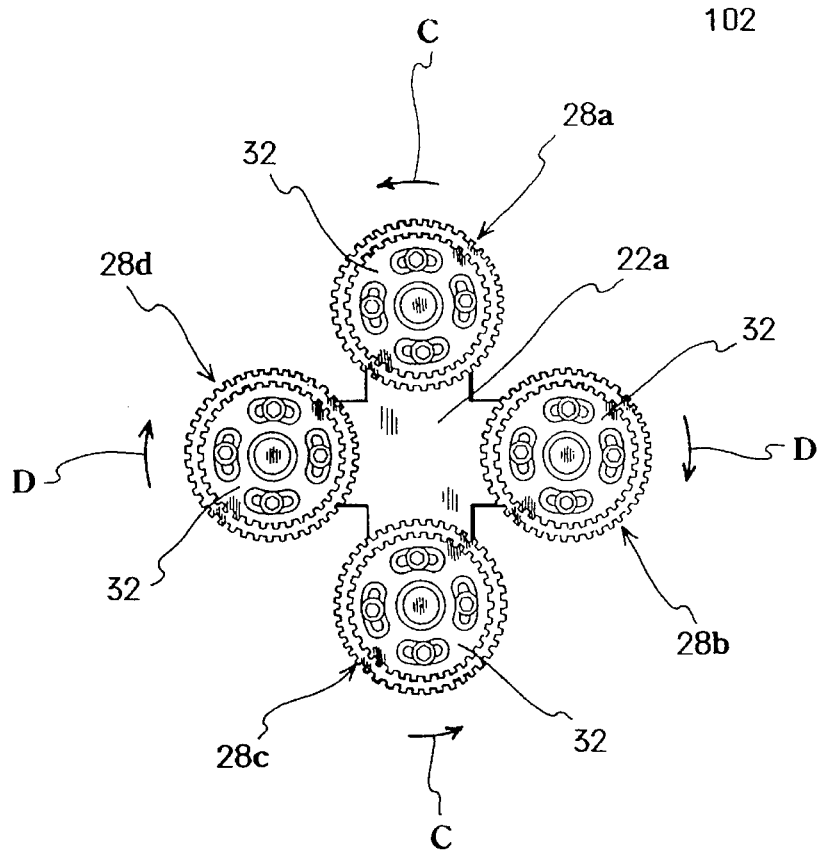
FIG. 14 is a partial plan view of a plurality of the movable gear sections, each of which is shown in FIGS. 12 and 13.

A plurality of the movable gear section shown in FIGS. 12 and 13 are provided, for example, as shown in FIG. 14. In principle, an even number of the movable gear sections are provided. In FIG. 14, four movable gear sections 28a, 28b, 28c and 28d are provided at regular angular intervals. In the adjacent movable gear sections 28a–28b, 28b–28c, 28c–28d and 28d–28a, the second pinion gears 32 are rotated in the mutually opposite directions (see arrows C and D) to remove the backlash.

A second example will be explained with reference to FIGS. 15–19. In the second example, the backlash between the first pinion gears and the first inner gear section, and between the second pinion gears and the second inner gear section can be automatically removed even if the gears are abraded.

In the first example shown in FIGS. 12–14, the relative angular position between the first pinion gears 30 and the second pinion gears 32 must be re-adjusted when the first pinion gears 30, the first inner gear section 40, the second pinion gears 32 and the second inner gear section 52 have been abraded.

Figure 15:
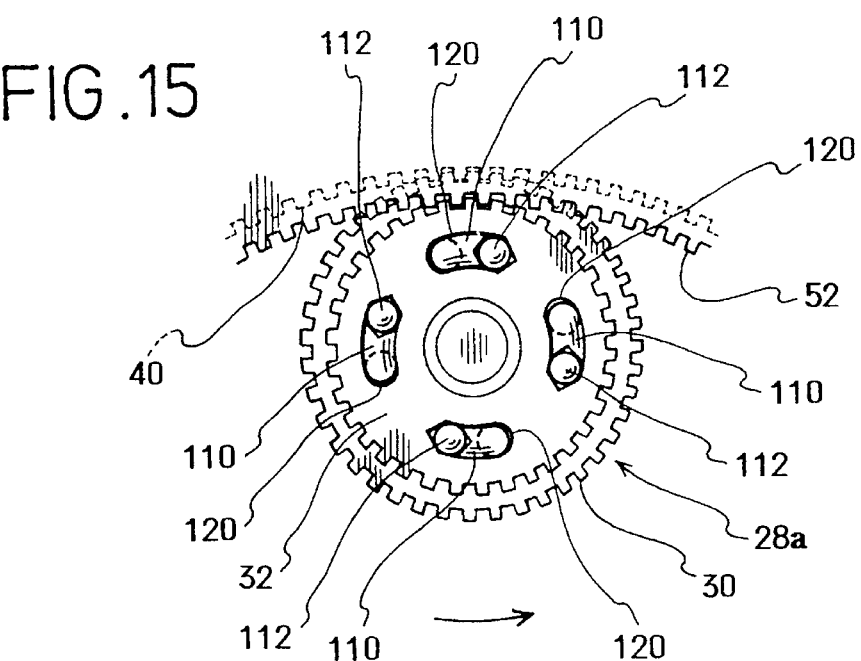
FIG. 15 is a partial plan view of the movable gear section having means for removing backlash.
Figure 16:
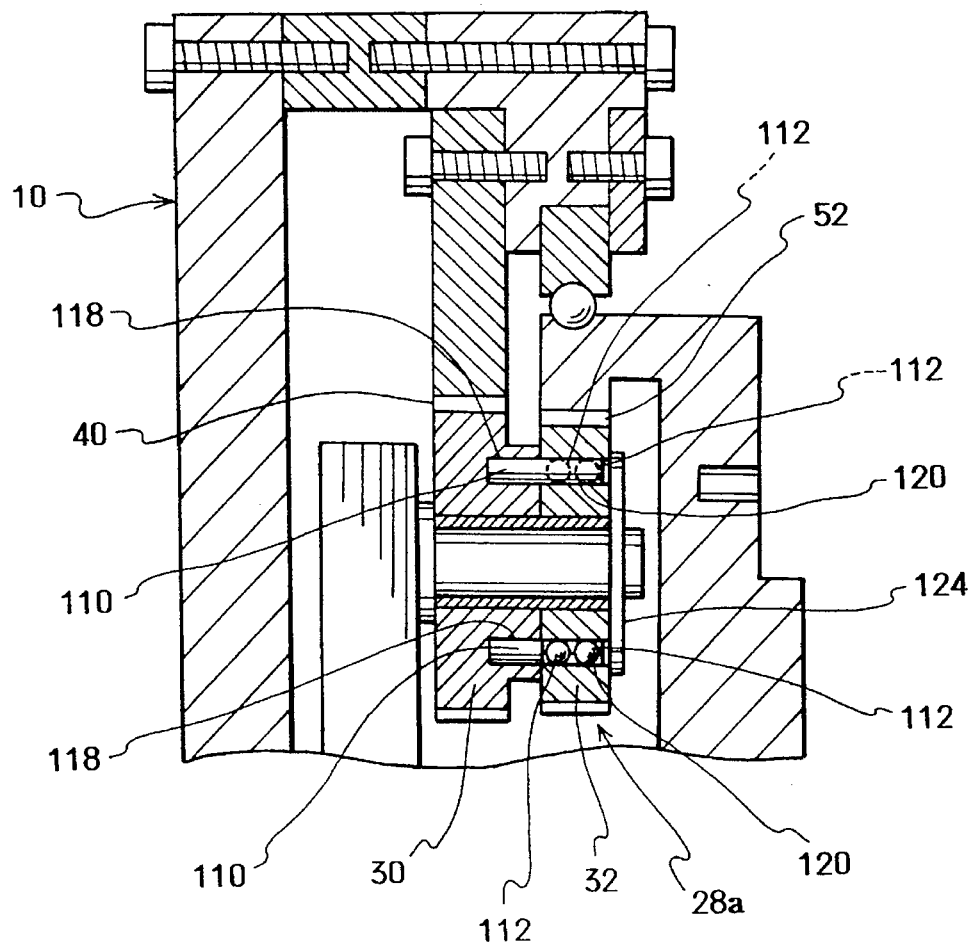
FIG. 16 is a partial sectional view showing the movable gear section shown in FIG. 15.

On the other hand, in the second example, there is elastically provided biasing members between the first pinion gear 30 and the second pinion gear 32 as shown in FIGS. 15 and 16. The biasing members always bias the first pinion gear 30 to contact the first inner gear section 40 to remove backlash therebetween; simultaneously the biasing members always bias the second pinion gear 32 to contact the second inner gear section 52 to remove backlash therebetween. By the biasing force, the backlash between the first pinion gear 30 and the first inner gear section 40, and between the second pinion gear 32 and the second inner gear section 52 can be automatically removed even if the gears are abraded.

Figure 18:
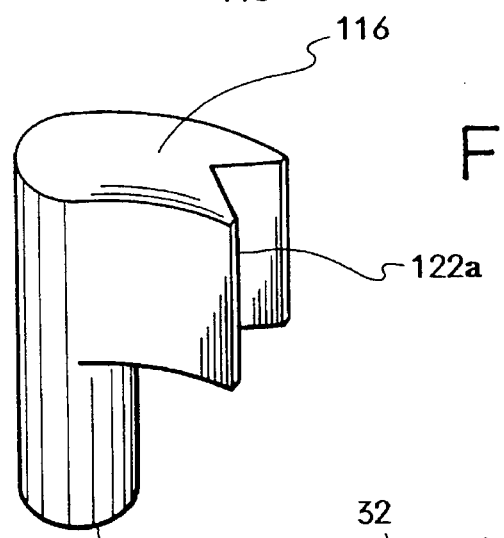
FIG. 18 is a perspective view of an L-formed member.

In the second example, the biasing members are an L-shaped member 110 and steel balls 112. As shown in FIG. 18, the L-shaped member 110 has a shaft section 114 and an arched horizontal section 116. There is formed a V-notch 122a on an end of the horizontal section 116. The shaft section 114 of the L-shaped member 110 is fitted in an engage hole 118, which is bored in the first pinion gear 30; the horizontal section 116 is movably provided in an arched through hole 120, which is bored in the second pinion gear 32. There is formed a V-notch 122b on an inner face of the arched through hole 120. The V-notches 122a and 122b symmetrically face each other. The steel balls 112 are press-fitted in the arched through hole 120 between the V-notches 122a and 122b. Note that, a lid 124 prevents the steel balls 112 from coming out of the arched through hole 120.

By press-fitting the steel balls 112, the steel balls 112 are elastically compressed, so that the elasticity of the steel balls 112 always biases the L-shaped member 110 in the direction of an arrow E. When the steel balls 112 are slightly compressed by inner faces of the V-notches 122a and 122b, if the L-shaped member 110 is able to freely move in the direction of the arrow E, the moving length of the L-shaped member 110 in the direction of the arrow E is longer than the compressed length of the steel balls 112. But, since the first pinion gears 30 engage with the first inner gear section 40 and the second pinion gears 32 engage with the second inner gear section 52, the movement of the L-shaped member 110 in the direction of the arrow E is limited, so that great elasticity is stored in the steel balls 112 as an internal stress. The internal stress works the second pinion gear 32 to turn in the circumferential direction, so that teeth of the second pinion gear 32 are elastically contacted teeth of the second inner gear section 52. Simultaneously, the internal stress works the first pinion gear 30, which is connected with the second pinion gear 32 by the shaft section 114, to turn in the circumferential direction, so that teeth of the first pinion gear 30 are elastically contacted teeth of the first inner gear section 40. By the elastic contact among the teeth, the backlash among the gears can be removed.

In the second example, even if the gears are abraded, the internal stress in the steel balls 112 always biases the first pinion gear 30 and the second pinion gear 32 to remove the backlash. Namely, the backlash can be automatically removed. By employing the steel ball(s) 112, the inner stress as the elastic force must be quite great, so greater elastic force can be maintained even if the L-shaped member 110 is slightly moved with the gear abrasion. Note that, the inner stress or the elastic force biasing the L-shaped member 110 can be defined on the basis of the diameter of the steel balls 112 and/or the angle of the V-notches 122a and 122b.

Figure 17:
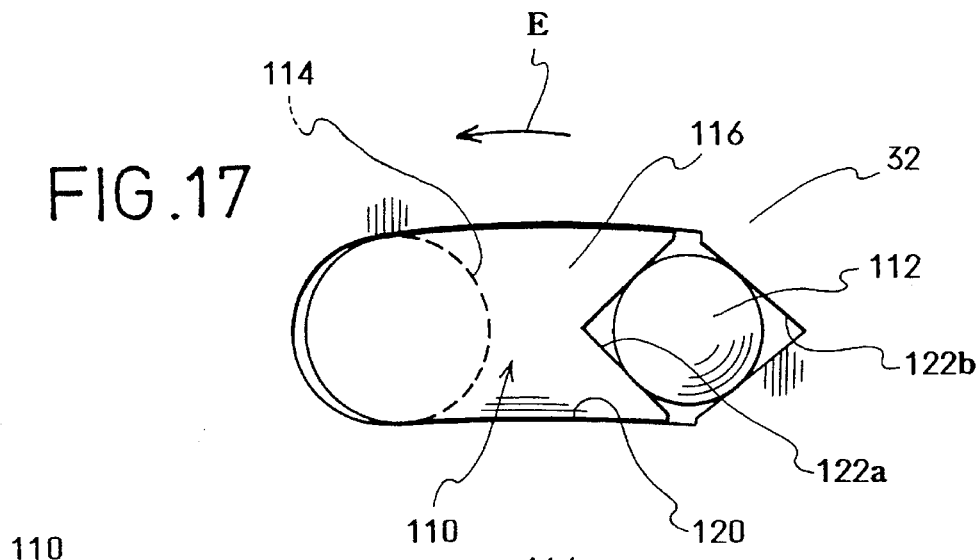
FIG. 17 is a partial enlarged view showing an arched through hole of the movable gear section shown in FIG. 15.
Figure 19:
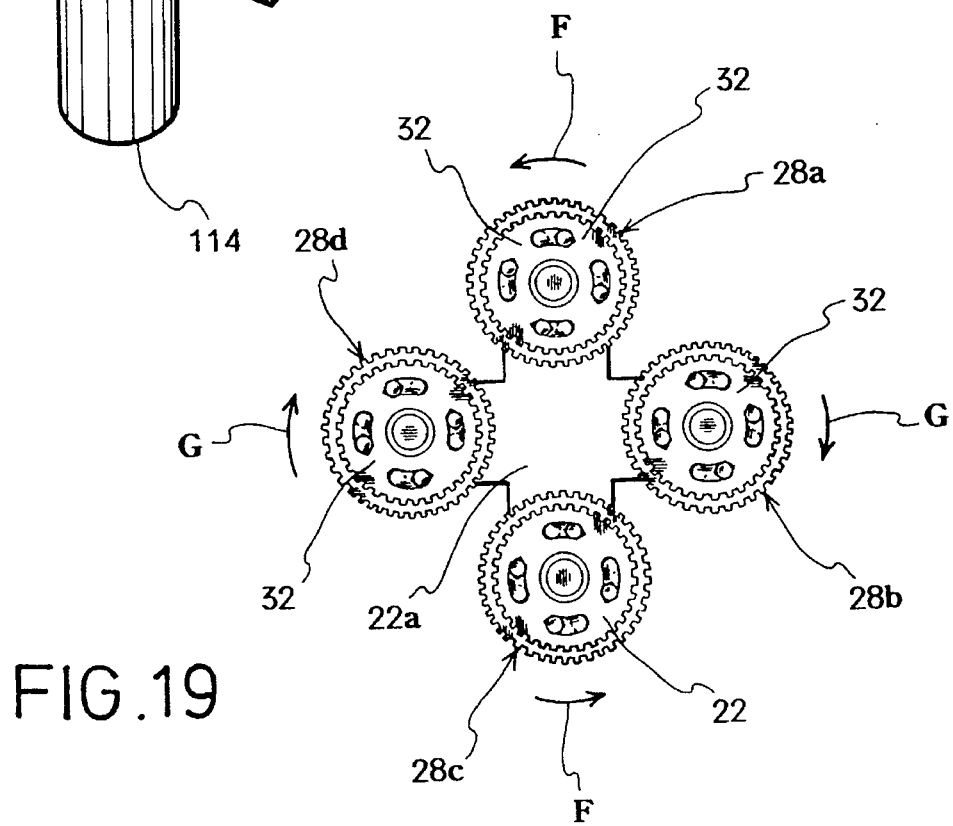
FIG. 19 is a partial plan view of a plurality of the movable gear sections, each of which is shown in FIGS. 15–18.

A plurality of the movable gear section shown in FIGS. 15–17 are provided, for example, as shown in FIG. 19. In principle, an even number of the movable gear sections are provided. In FIG. 19, four movable gear sections 28a, 28b, 28c and 28d are provided at regular angular intervals. In the adjacent movable gear sections 28a–28b, 28b–28c, 28c–28d and 28d–28a, the second pinion gears 32 are always biased in the mutually opposite directions (see arrows F and G) to remove the backlash. The biasing directions are defined by press-fitting positions of the steel ball(s) 112 in the arched through holes 120. Note that, the steel balls 112 and the horizontal section 116 may be provided in the first pinion gear 30.

In the second example of the means for removing the backlash, the L-shaped members 110 and the steel balls 112 are employed as the biasing members. The biasing members are not limited to these members. Any means, e.g., springs, elastic bodies, which are capable of biasing the first pinion gears 30 and the second pinion gears 32 to turn, may be employed as the biasing member(s).

In the above described embodiments, each speed changer has one fixed ring gear 38 and one output ring gear 44. The speed changer may further comprise: a second vertical shaft being provided on an upper face of the output ring gear 44;

a second movable gear section(s) being rotatably attached to the second vertical shaft; a second fixed ring gear encompassing a circular orbit of the second movable gear section(s); and a second output ring gear encompassing the circular orbit. In this case the speed changing ratio can be further increased. Of course, three or more speed changer of the present invention may be combined according to the use.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A speed changer comprising:

a movable gear section having a first pinion gear and a second pinion gear, which are coaxially integrated and which are capable of spinning about their common axis;

driving means for spinably moving said movable gear section on a circular orbit, said driving means including a hollow cylindrical member, said movable gear section being affixed to an outer circumferential surface of said hollow cylindrical member, and said hollow cylindrical member being disposed within a space surrounded by said movable gear section and coaxial with respect to said circular orbit, and capable of spinning about its axis;

a fixed ring gear fixedly encompassing the circular orbit, said fixed ring gear having a first inner gear section, formed on an inner circumferential face, wherein said first pinion gear is capable of engaging with said first inner gear section and rolling thereon;

an output ring gear rotatably encompassing the circular orbit, said output ring gear being coaxial to said fixed ring gear, said output ring gear having a second inner gear section, formed on an inner circumferential face, wherein said second pinion gear is capable of engaging with said second inner gear section and rolling thereon;

a casing for housing said movable gear section, said fixed ring gear, said output ring gear and said hollow cylindrical member, said casing having a through hole coaxial with respect to said hollow cylindrical member; and a hollow motor having a hollow section coaxial with respect to the through hole of said casing.

2. The speed changer according to claim 1, wherein a plurality of said movable gear sections are fixed to said hollow cylindrical member, whereby said movable gear sections are capable of integrally moving on the circular orbit.

3. The speed changer according to claim 1, wherein said driving means further includes a motor, which spins said hollow cylindrical member about its axis.

4. The speed changer according to claim 1, wherein said casing is filled with a lubricant.

5. The speed changer according to claim 2, wherein the first pinion gear and the second pinion gear of each moving gear section are coaxially arranged and mutually fixed by a fixing mechanism; and wherein one of said pinion gears is capable of moving in the circumferential direction with respect to the other so as to adjust a relative angular position therebetween.

6. The speed changer according to claim 2, wherein the first pinion gear and the second pinion gear of each moving gear section are coaxially arranged, and one of said pinion gears is biased in the circumferential direction with respect to the other by a biasing means, which is provided between said pinion gears.

7. A speed changer comprising:

a movable gear section having a first pinion gear and a second pinion gear, which are coaxially integrated and which are capable of spinning about their common axis;

driving means for spinably moving said movable gear section on a circular orbit, said driving means including a hollow cylindrical member, which has a driving gear engaging with the first pinion gear, wherein said hollow cylindrical member is disposed within a space surrounded by said movable gear section and coaxial to said circular orbit;

a fixed ring gear fixedly encompassing the circular orbit, said fixed ring gear having a first inner gear section, formed on an inner circumferential face, wherein said first pinion gear is capable of engaging with said first inner gear section and rolling thereon;

an output ring gear rotatably encompassing the circular orbit, said output ring gear being coaxial to said fixed ring gear, said output ring gear having a second inner gear section, formed on an inner circumferential face, wherein said second pinion gear is capable of engaging with said second inner gear section and rolling thereon;

a casing for housing said movable gear section, said fixed ring gear, said output ring gear, said driving gear and said hollow cylindrical member, said casing having a through hole coaxial relative to said hollow cylindrical member;

a hollow motor having a hollow section coaxial relative to the through hole of said casing.

8. The speed changer according to claim 7, and further including a ring member coaxially covering over said hollow cylindrical member, said ring member being capable of spinning about its axis and wherein a plurality of said movable gear sections are fixed to said ring member, whereby said movable gear sections are capable of integrally moving on the circular orbit.

9. The speed changer according to claim 7, wherein said driving means further includes a motor for spinning said hollow cylindrical member about its axis.

10. The speed changer according to claim 7, wherein said casing is filled with a lubricant.

11. The speed changer according to claim 8, wherein the first pinion gear and the second pinion gear of each moving gear section are coaxially arranged and mutually fixed by a fixing mechanism; and wherein one of said pinion gears is capable of moving in the circumferential direction with respect to the other so as to adjust a relative angular position therebetween.

12. The speed changer according to claim 8, wherein the first pinion gear and the second pinion gear of each moving gear section are coaxially arranged, and one of said pinion gears is biased in the circumferential direction with respect to the other by a biasing means, which is provided between said pinion gears.

* * * * *